United States Patent [19]

Gunnarsson

[11] Patent Number: 4,515,381
[45] Date of Patent: May 7, 1985

[54] STEERING CONTROL MECHANISM

[75] Inventor: Arne N. Gunnarsson, Upland, Calif.

[73] Assignee: FMC Corporation, Chicago, Ill.

[21] Appl. No.: 530,834

[22] Filed: Sep. 9, 1983

[51] Int. Cl.³ .............................................. B62D 1/20
[52] U.S. Cl. ........................................ 280/96; 180/78
[58] Field of Search ................. 280/93, 96, 95 R, 771; 180/78

[56] References Cited

U.S. PATENT DOCUMENTS

| | | | |
|---|---|---|---|
| 1,209,144 | 12/1916 | Gordon | 280/96 |
| 1,760,749 | 5/1930 | Gillespie | 280/96 |
| 2,865,222 | 12/1958 | Bachman | 180/78 |
| 3,578,782 | 5/1971 | Miyoshi | 180/78 |
| 3,633,933 | 1/1972 | Millard | 280/96 |
| 3,927,899 | 12/1975 | Bough | 280/87 A |
| 4,110,864 | 9/1978 | Gunnarsson | 15/340 |

FOREIGN PATENT DOCUMENTS 97929  8/1979  Japan .................................. 280/771

Primary Examiner—Joseph F. Peters, Jr.
Assistant Examiner—Ross Weaver
Attorney, Agent, or Firm—A. J. Moore; H. M. Stanley; R. B. Megley

[57] ABSTRACT

The steering control system of the present invention includes a steering gear box mounted on an axle of a vehicle substantially of the midpoint between steerable wheels journaled on and connected to knuckle joints on the ends of the axle. The input shaft of the gear box is connected to the steering wheel shaft by a slip joint. The longitudinal axis of the input shaft, slip joint shaft and wheel shaft are all angled upwardly and rearwardly with the total rearward angle being about 22° and the rearward angle of the input shaft being about 7°. Mounting the gear box on the axle rather than on a sprung portion of the vehicle minimizes impact forces due to rough roads from being transmitted to the operator through the steering wheel and from damaging the gear box.

5 Claims, 5 Drawing Figures

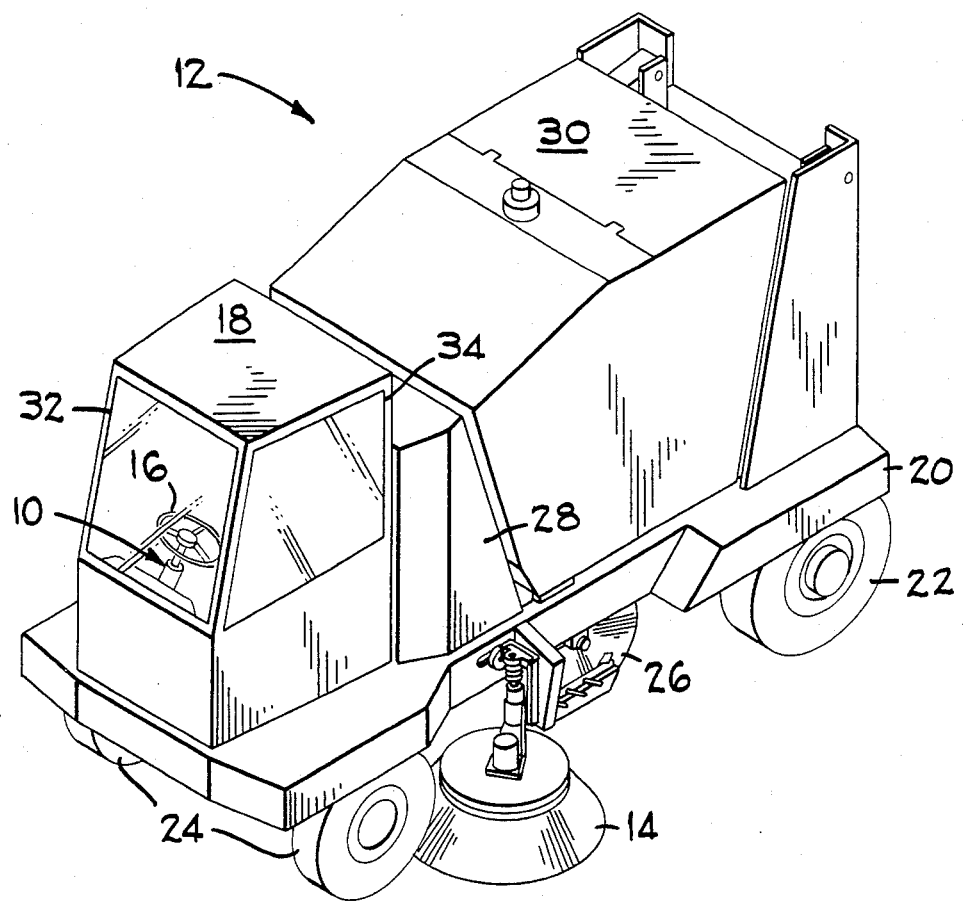
FIG_1

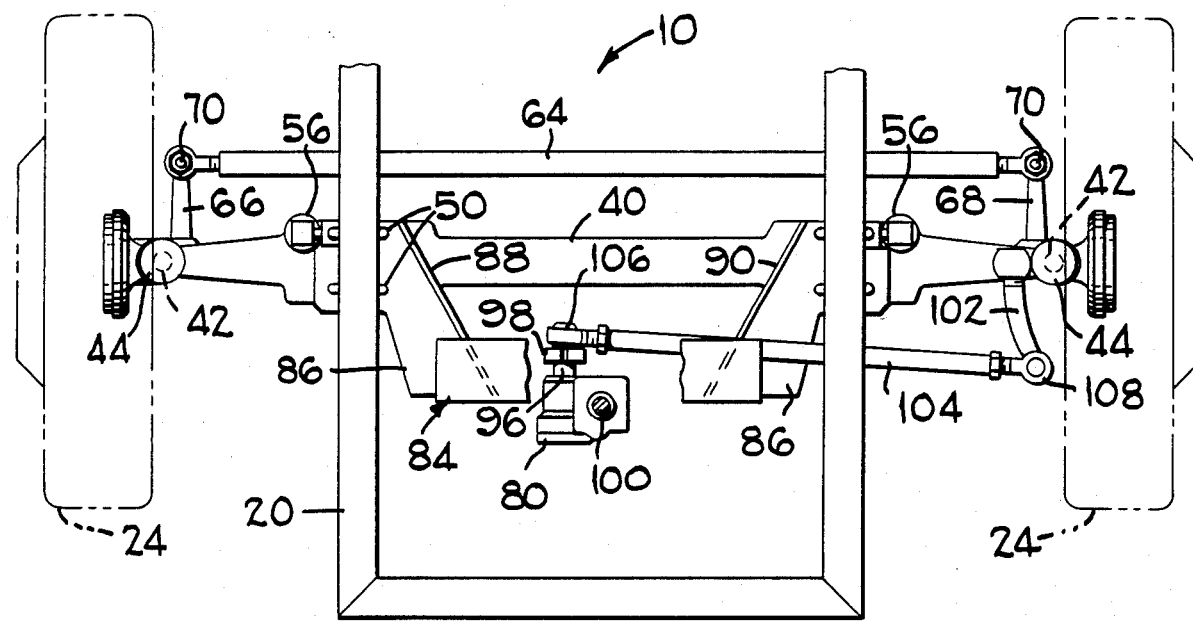
FIG_2
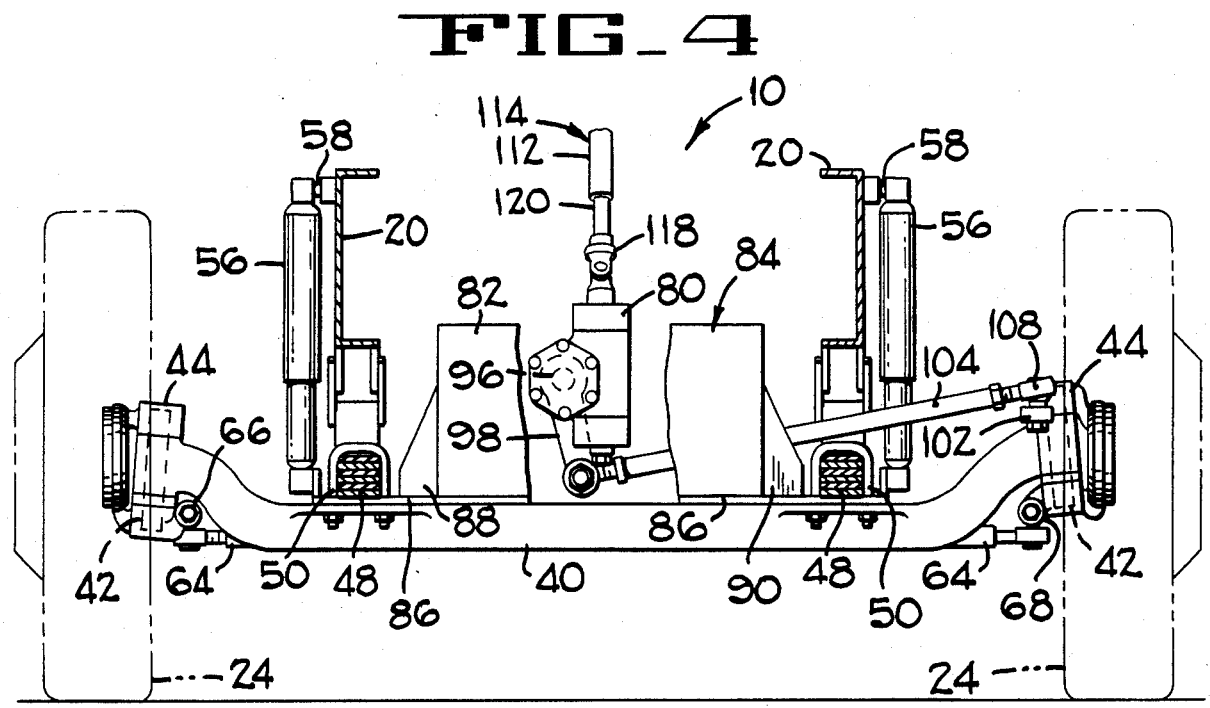
FIG_4

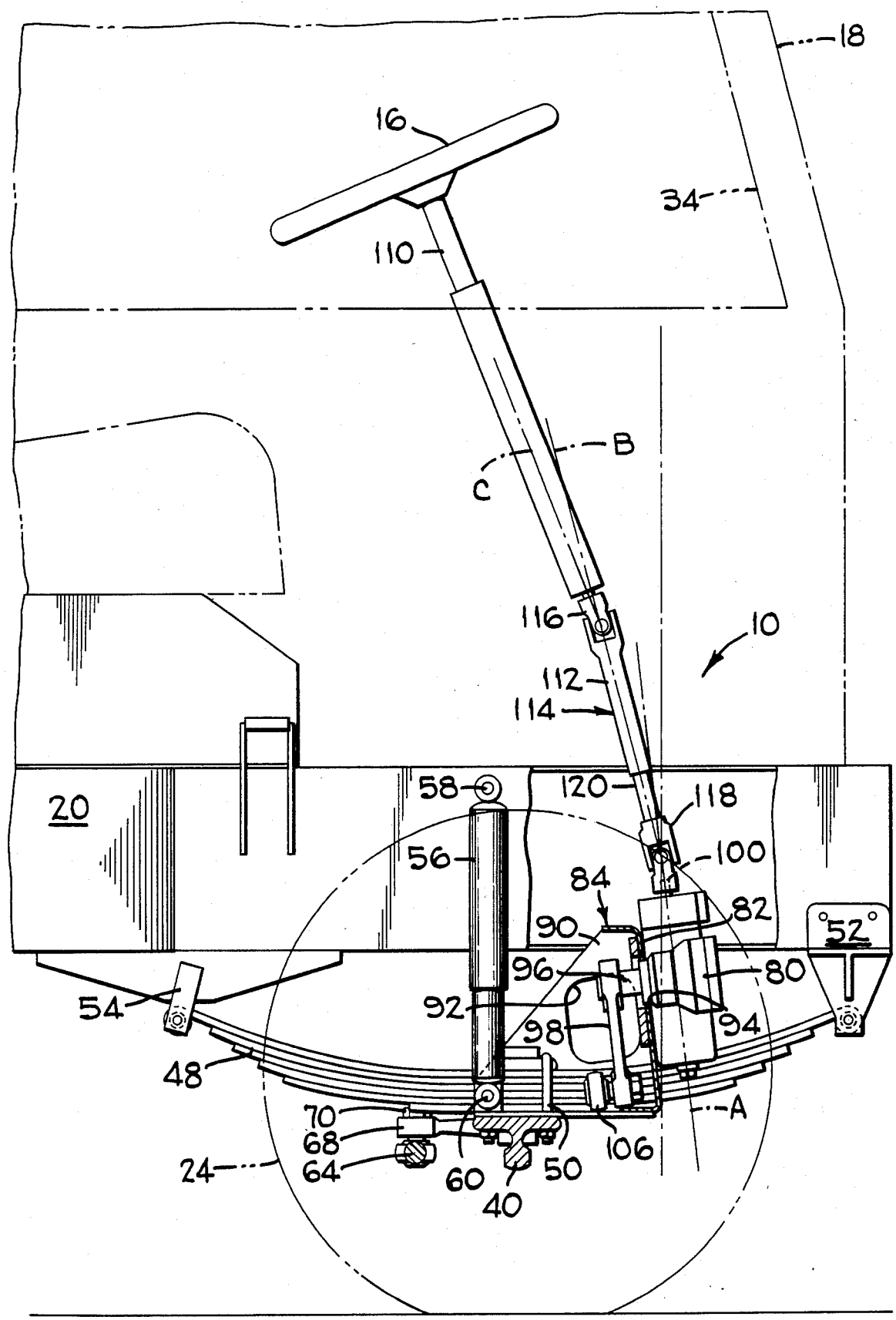

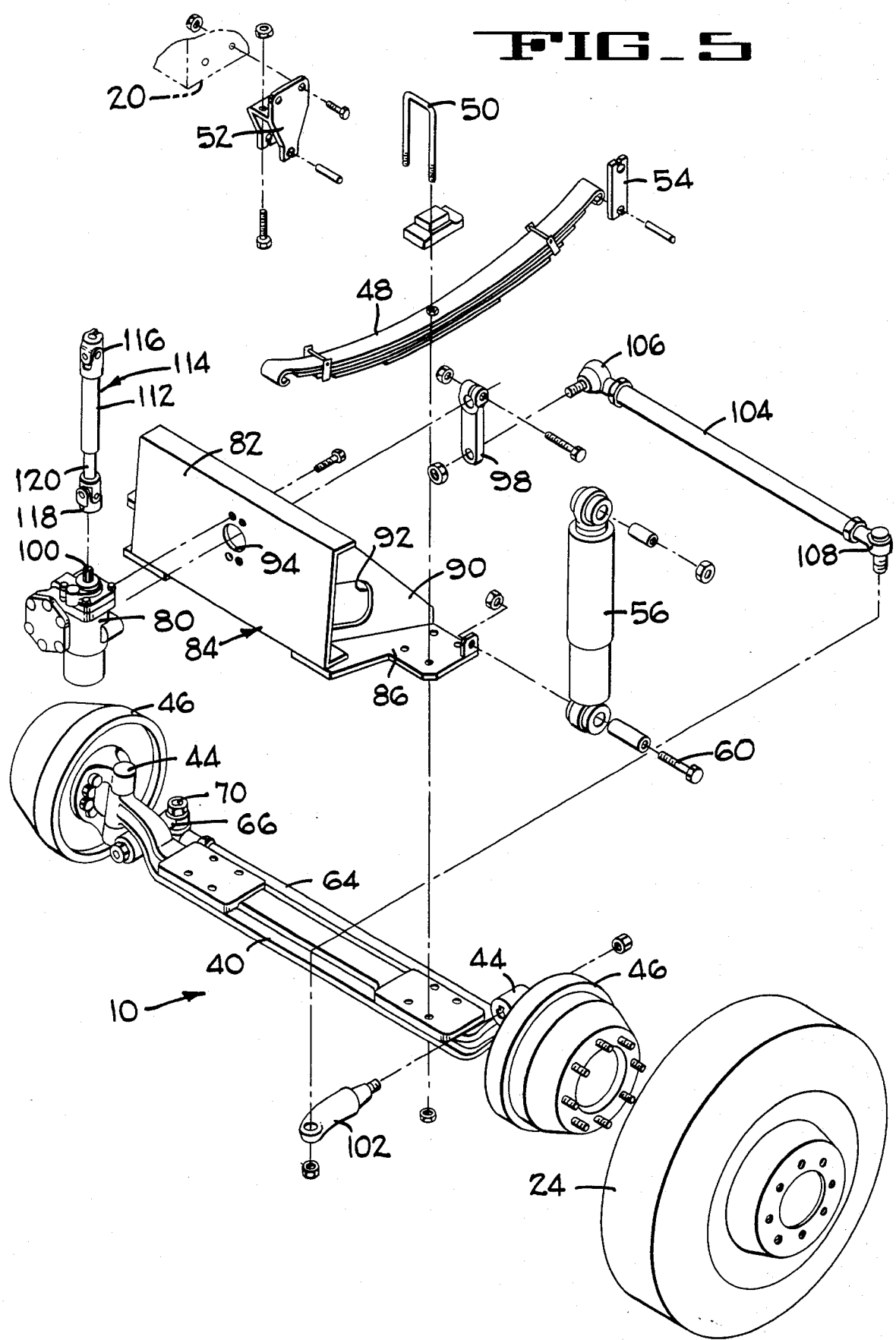
FIG_5

STEERING CONTROL MECHANISM

BACKGROUND OF THE INVENTION

1. Field of the Invention

The present invention relates to a steering control system for street sweeping vehicles or the like and more particularly relates to steering control systems which are centrally located transversely of the vehicle for enabling an operator to guide the vehicle when components carried on the right or left side of the vehicle are alternately used without requiring dual steering controls.

2. Description of the Prior Art

Many prior art street sweepers were mounted on the chassis of commercially available trucks with standard wide cabs and standard steering gear therein. Assignee's U.S. Pat. No. 4,110,864 which issued to Gunnarsson on Sept. 5, 1978 illustrates this type of vehicle.

A street sweeper with a narrow cab is illustrated in Assignee's U.S. Gunnarsson Application Ser. No. 431,949 which was filed on Sept. 30, 1982 for a Hopper Support and Dump Mechanism.

SUMMARY OF THE INVENTION

The steering control system of the present invention includes a sub-frame bolted to an axle having steerable wheels rotatably and pivotally mounted thereon. A steering gear box is bolted to the sub-frame at the transverse midpoint between the steerable wheels permitting a steering wheel to be centered in the cab of the vehicle. The cab is supported on a chassis which is partially supported on the axle by springs and shock absorbers. Motion of the sprung chassis and steering wheel relative to the axis is accommodated by a slip joint and universal joints connecting the steering gear box to the steering wheel. Kick-back or shock damage to the gear box due to motion of the chassis relative to the axle is minimized by rigidly securing the gear box to the axle supported sub-frame; and locating the steering wheel centrally of the narrow cab enabling the operator to control a vehicle such as a street sweeper with a single steering wheel and one set of controls when using either a right gutter broom or a left gutter broom in a street sweeping operation.

BRIEF DESCRIPTION OF THE DRAWINGS

FIG. 1 is a diagrammatic perspective of a four wheel street sweeper having the steering control system of the present invention connected to the front wheels thereof.

FIG. 2 is a plan of the front axle and associated steering components taken below the level of the cab, certain parts being cut away.

FIG. 3 is a side elevation of the steering control system with parts cut away and other parts shown in phantom.

FIG. 4 is a front view of the steering control system with certain parts being cut away to illustrate the steering gear box.

FIG. 5 is an exploded perspective of the components of the steering control system.

DESCRIPTION OF THE PREFERRED EMBODIMENT

The steering control mechanism 10 (FIGS. 2-5) of the present invention is intended for use on a vehicle 12 such as the street sweeper illustrated in FIG. 1, which selectively uses components such as right and left hand gutter brooms 14 (only the left gutter broom being shown). In order to properly align the right or left gutter broom with the adjacent curb or gutter of a street being swept, it is desirable to have a single set of controls which include a single centrally located steering wheel 16 in a narrow cab 18, rather than dual controls in a wide cab.

The street sweeping vehicle 12 (FIG. 1) includes a chassis 20 supported by a pair of rear drive wheels 22 and a pair of front steerable wheels 24. The street sweeper also includes right and left gutter brooms 14 with only the left gutter broom being illustrated, a pick-up broom 26, and a debris elevator (not shown) within an elevator housing 28 which deposits debris into a hopper 30 during operation. The vehicle is power driven and the narrow cab 18 is centered transversely of the vehicle 12 above the steerable wheels 24 and has the steering wheel 16 of the steering control mechanism 10 centered transversely in the cab. The cab 18 includes a front window 32 and side windows 34 enabling the operator when seated in the middle of the cab to easily observe and control the street sweeping operation when using either the right or left gutter broom 14.

Having reference to FIGS. 2-5, the steering control mechanism 10 includes a front axle 40 rotatably and pivotally connected to the steerable wheels 24 by conventional king pins 42, yoke or knuckle joints 44, and conventional front brake assemblies 46, (FIG. 5). Leaf springs 48 are rigidly secured to the axle 40 by U-bolts 50 and are pivotally connected to the chassis 20 by fixed brackets 52 and pivotal brackets 54 in a conventional manner. Also, shock absorbers 56 are pivotally connected between the axle 40 and the chassis 20 by bolts or capscrews 58 and 60. A tie rod 64 is pivotally connected to right and left arms 66,68 projecting rearwardly from the right and left knuckles 44 by capscrews 70.

An important feature of the invention is the concept of supporting a steering gear box 80 on the axle 40 rather than upon a sprung portion of the vehicle 12 such as the chassis 20.

As best shown in FIGS. 3 and 5, the steering gear box 80 is bolted to a rearwardly inclined front wall 82 of a channel shaped sub-frame 84 which has rearwardly and outwardly angled feet 86 welded thereto and reinforced by gussets 88,90 with the left gusset 90 having an opening 92 therein. The sub-frame 84 is rigidly secured to the axle 40 by bolting. The front wall 82 of the sub-frame 84 has a hole 94 therein for accommodating an output shaft or steering spindle 96 to which a steering lever 98 is rigidly secured.

The gearing within the steering box is conventional with clockwise movement of the steering wheel 16 and gear box input shaft 100 (FIG. 2) being responsive to rotate the steering spindle clockwise as viewed in FIG. 4. A steering arm 102 is rigidly secured to the left knuckle 44; and a steering rod 104 is pivotally connected between the steering lever 98 and the steering arm 102 by self aligning bushings 106 and 108, respectively.

The steering wheel 16 (FIG. 3) is supported in the cab 18 by a conventional steering column which includes a shaft 110 connected to the upper portion 112 of a telescoping slip joint 114 by an upper universal joint 116. A lower universal joint 118 connects a lower portion 120 of the slip joint to the input shaft 100 of the gear box 80. The upper and lower portions of the slip joint 114 are splined together for rotation as a unit and axial movement relative to each other.

Having reference to FIG. 3, it will be noted that the axis A of the gear box shaft 100 and front wall 82 of the sub-frame 84 are angled only about 7° upwardly and rearwardly from the vertical; the axis B of the slip joint 114 is angled upwardly and rearwardly from the axis A of only about 8°; and the axis C of the steering column shaft 110 is angled upwardly and rearwardly from the axis B only about 7°.

Since the gear box 80 (FIGS. 2-4) is supported by the axle 40 at the transverse midpoint between the front wheels 24, and since all other steering components up to the lower swivel joint 118 are indirectly supported by the axle, a minimum of force will be applied to the gear box in the event one wheel should contact an abrupt abutment or chuck hole in the road.

It will be noted that the steering wheel shaft 110 (FIG. 3) is angled rearwardly so that the operator can comfortably grasp the steering wheel, and that the three relatively small angles when totaled equals about 22°. These shallow angles from the gear box 80 to the steering wheel shaft 110 coupled with the concept of positioning the gear box at the transverse midpoint between the front wheels 24, minimizes damage to the gear box 80 by kick-back in response to hitting road bumps or the like and minimizes transmittal of these forces to the steering wheel 16.

Locating the steering wheel at the transverse center of the vehicle 12 in a narrow cab also makes it possible for an operator to have a single set of controls, including the steering wheel, while still being able to easily see and control components on the right and left hand side of the vehicle 12 such as right and left gutter brooms, without requiring dual controls.

From the foregoing description it is apparent that the steering control system of the present invention includes a steering gear box that is rigidly supported by the axle of the vehicle rather than by a sprung portion of the vehicle and is located at the transverse midpoint between the wheels. The slip joint connection of the steering wheel to the gear box includes three shallow angles which minimizes shock or kick-back forces from being transmitted to the steering wheel, while the central location of the gear box on the front axle minimizes damage to the gear box due to kick-back forces being applied thereto.

Although the best mode contemplated for carrying out the present invention has been herein shown and described, it will be apparent that modification and variation may be made without departing from what is regarded to be the subject matter of the invention.

What is claimed is:

1. A steering control system for a vehicle having a narrow cab secured to a chassis connected by springs to an axle having knuckle joints pivoted to the opposite end of the axle with the levers projecting outwardly from the knuckles and pivotally interconnected by a tie rod, and with a steerable wheel journaled on each of said knuckles; the improvement comprising:

a sub-frame rigidly secured to said axle between said wheels and having a front wall extending forwardly of said axle and angled upwardly and rearwardly;

a steering gear box rigidly secured to said front wall at substantially the midpoint between said wheels and spaced forwardly and above said axle, said gear box having an upwardly and rearwardly directed input shaft having a first longitudinal axis angled at about 7° relative to a vertical plane and having an output shaft normal to said input shaft and directed rearwardly of said vehicle;

a steering lever rigidly secured to said output shaft;

a steering arm rigidly secured to one of said knuckles;

a steering rod pivotally connecting said steering lever to said steering arm;

a steering wheel and steering wheel shaft journaled for rotation in said narrow cab and lying in a longitudinal plane at approximately the transverse midplane of said cab and vehicle and having a second longitudinal axis; and means defining a slip joint having a third longitudinal axis lying in said longitudinal plane and universal joints on opposite ends thereof connecting said steering wheel shaft in driving engagement to said input shaft for steering said wheels in response to turning said steering wheel and for accommodating movement of the chassis axially and transversely of said second axis for minimizing damage to said gear box and minimizing transmission of shock forces to said steering wheel due to driving over rough roads.

2. An apparatus according to claim 1 wherein each of said first, second and third longitudinal axes are inclined upwardly and rearwardly of the vehicle, and wherein the sum of the rearward angles of the three axes from the vertical is about 22°.

3. An apparatus according to claim 1 wherein the longutidinal axis of said slip joint is angled about 8° relative to said input shaft axis, and the axis of said steering wheel shaft is angled about 7° relative to said slip joint axis.

4. An apparatus according to claim 3 wherein said cab is a narrow cab transversely centered substantially midway between said wheels for enabling an operator to remain behind said steering wheel and visually observe the operation of components on the right and left sides of the vehicle.

5. An apparatus according to claim 4 wherein the vehicle is a street sweeper and said components are right and left gutter brooms.

* * * * *